(12) United States Patent
Miklatzky et al.

(10) Patent No.: US 7,154,077 B2
(45) Date of Patent: Dec. 26, 2006

(54) DEVICE AND METHOD FOR MEASUREMENT OF INCIDENT POWER AND ENERGY

(75) Inventors: Efraim Miklatzky, Jerusalem (IL); Ephraim Greenfield, Jerusalem (IL)

(73) Assignee: Ophir Optronics Ltd., Jerusalem (IL)

(*) Notice: Subject to any disclaimer, the term of this patent is extended or adjusted under 35 U.S.C. 154(b) by 130 days.

(21) Appl. No.: 10/970,984

(22) Filed: Oct. 25, 2004

(65) Prior Publication Data
US 2005/0180487 A1     Aug. 18, 2005

Related U.S. Application Data

(60) Provisional application No. 60/544,231, filed on Feb. 13, 2004.

(51) Int. Cl.
*G01J 1/44* (2006.01)
*G01J 1/56* (2006.01)
*H01J 7/24* (2006.01)

(52) U.S. Cl. ............... 250/214 C; 250/238; 356/216

(58) Field of Classification Search ......... 250/214 AL, 250/214 B, 214 C, 238; 356/213, 216, 220, 356/221, 222, 437, 438, 439
See application file for complete search history.

(56) References Cited

U.S. PATENT DOCUMENTS 5,376,783 A * 12/1994 Vecht et al. ............ 250/208.2
5,826,982 A * 10/1998 Schieferdecker et al. ... 374/149

* cited by examiner

*Primary Examiner*—Georgia Epps
*Assistant Examiner*—Don Williams
(74) *Attorney, Agent, or Firm*—Shalom Wertsberger; Saltamar Innovations

(57) ABSTRACT

Devices and methods for measurement of energy from a defined source having increased accuracy in measuring low energies. The device comprises a housing containing sensors. A first sensor receives energy from the source and produces a first output. A second sensor receives ambient energy only and produces a second output. Subtraction of the second output from the first output produces a more accurate corrected output. The method includes providing a housing containing a first sensor and a second sensor and directing energy from the defined source to a surface of the first sensor thereby causing the first sensor to produce a first output while only ambient energy from sources other than the defined source is applied to a surface of the second sensor which produce a second output that is subtracted from the first output producing a corrected output.

18 Claims, 4 Drawing Sheets

Figure 1  20

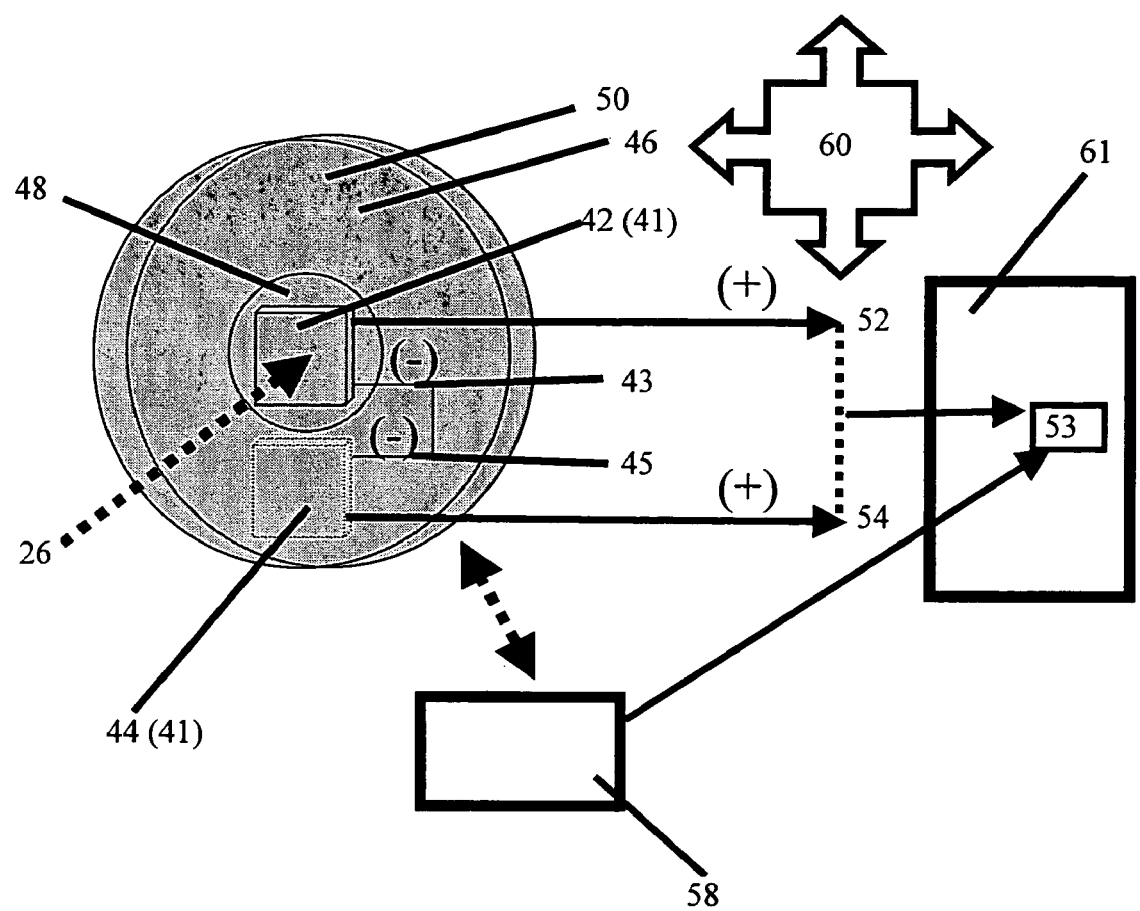
Figure 3 40

FIGURE 4    80
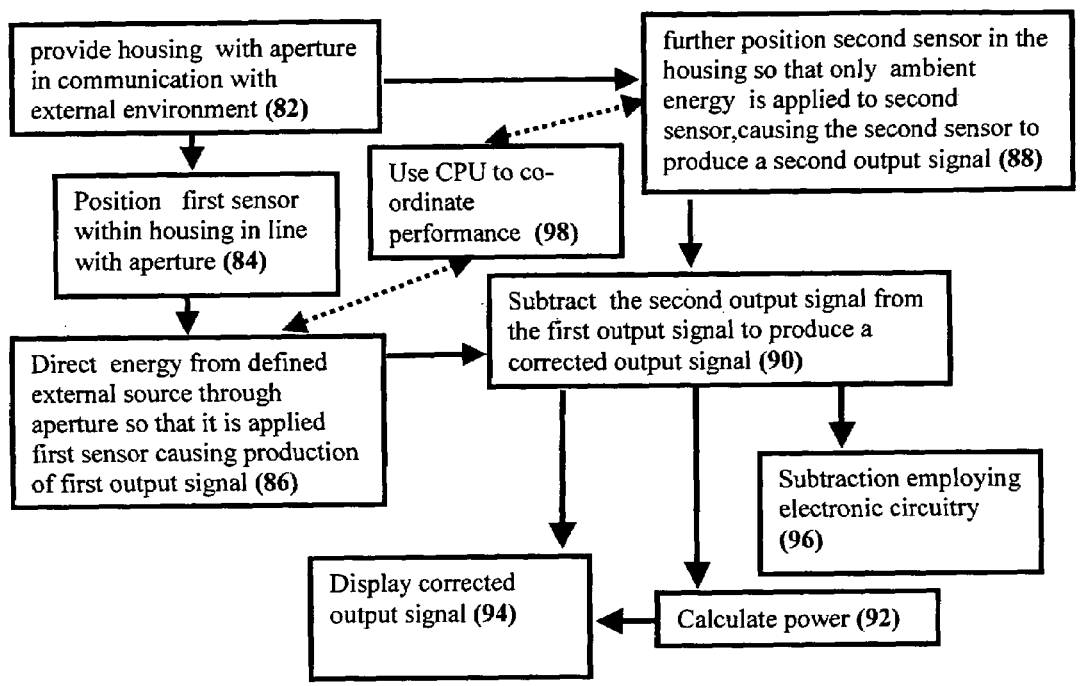

DEVICE AND METHOD FOR MEASUREMENT OF INCIDENT POWER AND ENERGY

This application claims priority from U.S. Patent Application No. 60/544,231 filed on Feb. 13, 2004 and currently pending.

FIELD AND BACKGROUND OF THE INVENTION

The present invention relates to a device and method for measurement of incident power and energy and, more particularly, to devices and methods which reduce errors in measurement due to variations in background radiation.

The term "power" as used herein refers to any measure of applied energy expressed as a function of time (e.g. 1 Watt=1 joule/s).

Previously available thermal power meters based on the thermopile effect are used to measure the powers and energies of lasers or other light sources. These meters are based on the effect of heat flow through the sensor causing a temperature difference, which is converted by a thermopile into a voltage proportional to the power flowing through the device. FIG. 1 shows such a previously available device 20 based on use of a commercial thermoelectric cooler (TEC; 24) used in a reverse fashion where instead of a current flow through the device causing a temperature difference across the faces, flow of heat 22 induced by incident energy 26 causes a temperature difference across the faces which, in turn causes a current flow through a resistor and hence a voltage essentially proportional to the power applied to the device. A pulse of incident energy 26 (e.g. from a laser beam) applied to an absorbing surface 28 can also be measured by integrating the voltage produced over time where the energy is $\propto \int$ power dt (FIG. 2). Devices of this type are used typically for powers from 1 mW to 10 Watts and energies of 0.1 mJ to 10 J. Devices of this type rely upon a heat sink disc 30 (FIG. 1) to minimize the effect of ambient energy from other sources.

Devices of this type are inherently limited with respect to measurement of low powers and energies due to interference from ambient background radiation and temperature. Since devices of this type measure a total temperature difference induced on the sensor from any source, the accuracy of the measurement is adversely affected because the light source being measured, changes in air temperature, and changes due to uneven radiation on the case of the measuring device all contribute to the total temperature difference. For instance, with the Ophir model 3A-P (Ophir Optronics, Jerusalem, Israel), although the power noise level of the device is rated at 10 µW, the long term change in reading of power over a measurement period of approximately 1 hour under typical room conditions is more than 300 µW even though the meter is enclosed in an insulating housing. Thus devices of this type introduce an unacceptable level of error into measurements, especially when measuring applied powers less than ~1 mW.

U.S. Pat. No. 5,376,783 attempts to address the problem of background radiation as it affects measurement. However, this patent has, as an inherent limitation, a strict requirement for the measurement of light.

There is thus a widely recognized need for, and it would be highly advantageous to have, a device and method for measurement of incident power and energy devoid of the above limitation.

SUMMARY OF THE INVENTION

It is an object of the present invention to reduce errors in measurement arising from variations in background radiation.

According to one aspect of the present invention there is provided a device for measurement of an incident energy source as power and/or energy.

According to another aspect of the present invention there is provided a method for measurement of an incident energy source as power and/or energy.

According to an additional aspect of the present invention there is provided a background insensitive device for measurement of energy from a defined external source. The device includes: (a) a housing, the housing defining an internal cavity and having an aperture in fluid communication with an external environment; (b) a first sensor, the first sensor positioned in the internal cavity of the housing in line with the aperture so that the energy from the defined external source is applied to a surface of the first sensor when the energy is directed through the aperture, the first sensor producing a first output signal; and (c) a second sensor, the second sensor positioned in the internal cavity of the housing so that only ambient energy from sources other than the defined external source is applied to a surface of the second sensor, the second sensor producing a second output signal. Subtraction of the second output signal from the first output signal produces a corrected output signal, the corrected output signal more accurately defining the energy from the defined external source than the first output signal.

According to another aspect of the present invention there is provided a background insensitive method for measurement of energy from a defined external source. The method includes: (a) providing a housing, the housing defining an internal cavity and having an aperture in fluid communication with an external environment; (b) positioning a first sensor within the internal cavity of the housing in line with the aperture; (c) directing energy from the defined external source through the aperture so that the energy is applied to a surface of the first sensor causing the first sensor to produce a first output signal; (d) further positioning a second sensor in the internal cavity of the housing so that only ambient energy from sources other than the defined external source is applied to a surface of the second sensor, the ambient energy causing the second sensor to produce a second output signal; and (e) subtracting the second output signal from the first output signal to produce a corrected output signal, the corrected output signal more accurately defining the energy from the defined external source than the first output signal.

According to further features in preferred embodiments of the invention described below, the first and the second sensors are each temperature sensors.

According to still further features in the described preferred embodiments the temperature sensors are thermoelectric coolers (TECs).

According to still further features in the described preferred embodiments the first and the second outputs are each a voltage.

According to still further features in the described preferred embodiments the device further includes a data processing component designed and configured to calculate power of the defined external source by integrating the corrected output signal produced over time.

According to still further features in the described preferred embodiments each of the first and second sensors employ a thermopile to convert a temperature difference into a voltage proportional to a power.

According to still further features in the described preferred embodiments the device further includes a display capable of providing an indication of the corrected output signal.

According to still further features in the described preferred embodiments the defined external source is a laser beam.

According to still further features in the described preferred embodiments the subtraction of the second output signal from the first output signal is effected by means of electronic circuitry.

According to still further features in the described preferred embodiments the electronic circuitry includes a connection between a negative terminal of the first sensor and a negative terminal of the second sensor.

According to still further features in the described preferred embodiments the device includes a computerized central control unit is employed to co-ordinate operation.

According to still further features in the described preferred embodiments steady state power is measured.

According to still further features in the described preferred embodiments the method further includes employing a data processing component to calculate power of the defined external source by integrating the corrected output signal produced over time.

According to still further features in the described preferred embodiments the method further includes displaying an indication of the corrected output signal on a display device.

According to still further features in the described preferred embodiments the subtracting of the second output signal from the first output signal is effected by means of electronic circuitry.

According to still further features in the described preferred embodiments the method includes employing a computerized central control unit to co-ordinate performance of the method.

According to still further features in the described preferred embodiments at least one time measurement device is included.

The present invention successfully addresses the shortcomings of the presently known configurations by providing a device and method for measurement of laser power and energy, which reduce errors in measurement due to variations in background radiation.

Implementation of the method and device of the present invention involves performing or completing selected tasks or steps manually, automatically, or a combination thereof. Moreover, according to actual instrumentation and equipment of preferred embodiments of the method and device of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and device of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is a schematic representation of a device according to the present invention.

FIG. 4 is a simplified flow diagram illustrating a sequence of events associated with a method according to the present invention.

DESCRIPTION OF THE PREFERRED EMBODIMENTS

Figure 1:
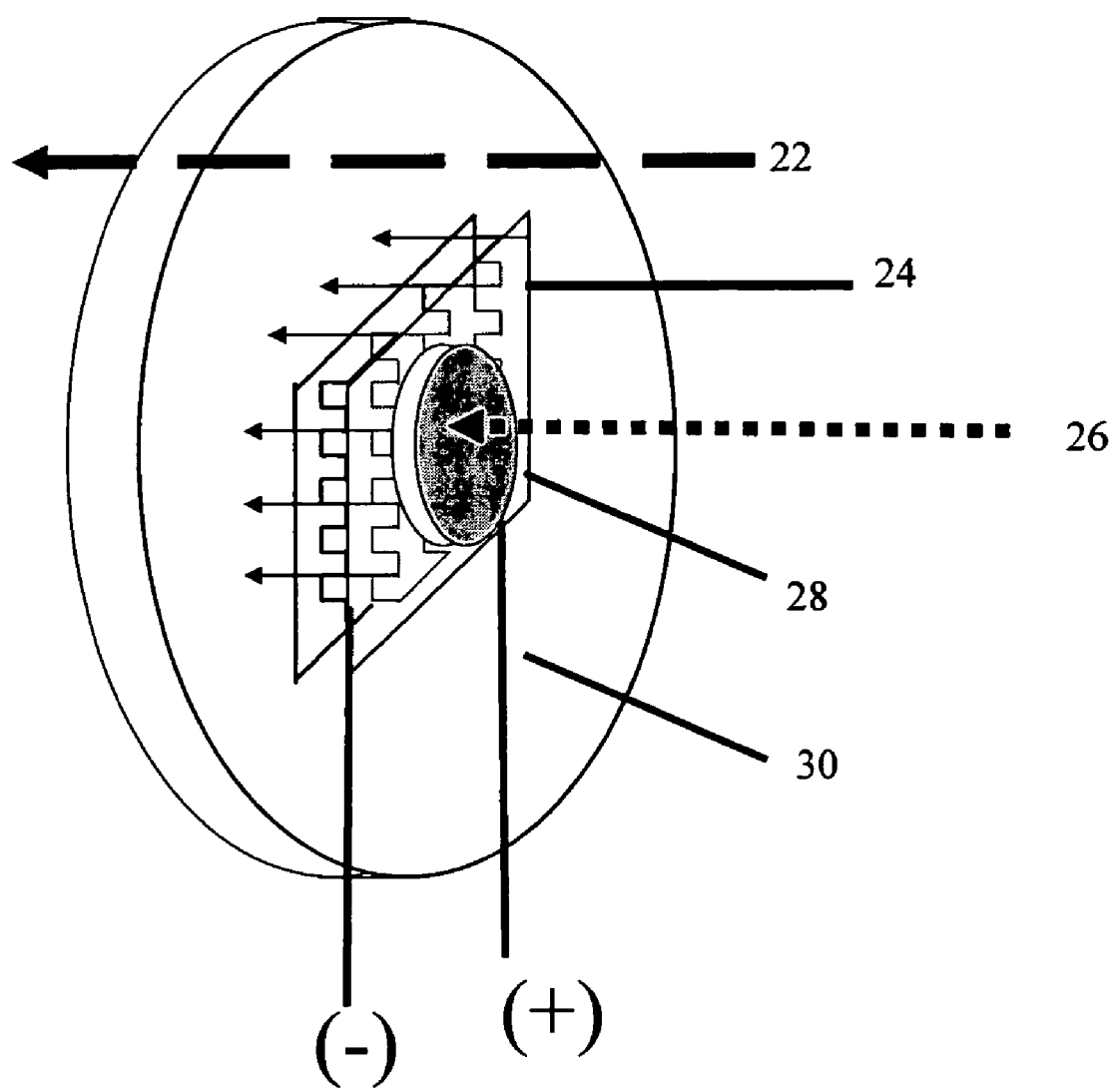
FIG. 1 is a schematic representation of a prior art device for measurement of incident power and energy, characterized by inherently inaccurate measurements of low applied energies, which relies upon a single sensor.
Figure 2:
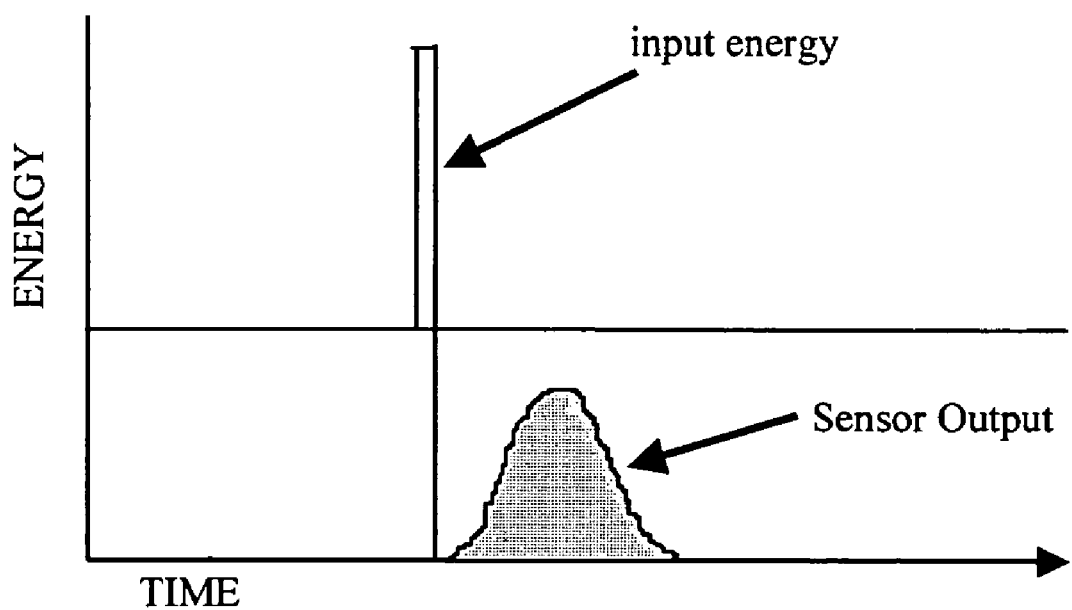
FIG. 2 is a histogram illustrating applied energy and measured energy employing a device as pictured in FIG. 1.

The present invention is of a device and method which can be employed for measurement of incident power and energy.

Specifically, the present invention reduces errors in measurement due to variations in background radiation.

The principles and operation of a device and method according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention is primarily embodied by a background insensitive device 40 for measurement of energy 26 from a defined external source. Preferably the defined external source is a laser beam. Device 40 includes a housing 46 defining an internal cavity 50 and having an aperture 48 in fluid communication with an external environment 60.

Device 40 further includes a first sensor 42 positioned in internal cavity 50 of housing 46 in line with aperture 48 so that energy 26 from the defined external source is applied to a surface 41 of first sensor 42 when energy 26 is directed through aperture 48. First sensor 42 produces a first output signal 52 in proportion to energy 26 and provides an approximation thereof. As described hereinabove in the background section of this application, this approximation decreases in accuracy as the amount of energy 26 decreases. This is because first output signal 52 is also influenced by unwanted ambient energy (e.g. from a climate control system in the area in which the measurement is being conducted).

In order to overcome this problem, device 40 further includes a second sensor 44 positioned in internal cavity 50 of housing 46 so that only ambient energy from sources other than the defined external source is applied to a surface 41 of second sensor 44. Second sensor 44 produces a second output signal 54 proportional to the ambient energy. Subtraction of second output signal 54 from first output signal 52 produces a corrected output signal 53. Corrected output signal 53 is a more accurate measurement of energy 26 from the defined external source than first output signal 52.

Optionally, but preferably, sensors 42 and 44 are connected to one another by their negative terminals 43 and 45 (indicated by (−) in FIG. 4) so that any temperature effect which effects both sensors will be cancelled while any effect which effects only one sensor will be measured. The terms "subtraction" and "subtracting" as used in this specification and the accompanying claims specifically includes subtraction of negative values. For example, if first sensor 42 measures 0.5 mW and a second sensor 44 measures (−) 0.1 mW, the result of the subtraction is 0.6 mW. Such a result might be expected to occur if a strong air conditioner is operating during the measurement procedure.

This subtraction of second output signal 54 from first output signal 52 is preferably effected by means of electronic circuitry, such as, for example, a connection between negative terminal 43 of first sensor 42 and a negative terminal 45 of second sensor 44.

Preferably sensors 42 and 44 are each temperature sensors, more preferably thermoelectric coolers (TECs). TECs are described in detail in the background section hereinabove with regard to FIG. 1.

Preferably outputs 52 and 54 are each a voltage. Voltage may be converted to power, for example, by an optional data processing component 58 which calculates power of the defined external source by integrating the corrected output signal 53 produced over time. Thus corrected output signal 53 may be expressed in units of power.

More preferably, each of sensors 52 and 54 employ a thermopile to convert a temperature difference into a voltage proportional to a power.

Most preferably device 40 further includes a display 61 capable of providing an indication of corrected output signal 53. Display 61 may be, for example an LED, LCD, CRT, plasma screen, printout or audio signal. Display 61 may receive output from data processor 58. Output signal 53 may be presented as numerical data, or in a graphic format (e.g. plot of energy 26 as a function of time).

According to some preferred embodiments of the invention, device 40 includes a computerized central control unit 58 employed to co-ordinate operation. Control unit 58 may be connected to sensors 42 and 44 via any convenient channel of communication or interface. Thus data pertaining to corrected output signal 53 may be stored in a memory of computerized control unit 58 for subsequent review, manipulation or display.

Most preferably, steady state power of energy 26 is measured by device 40.

The present invention is further embodied by a background insensitive method 80 for measurement of energy 26 from a defined external source. Method 80 includes providing 82 housing 46 defining internal cavity 50 and having an aperture 48 in fluid communication with external environment 60.

Method 80 further includes positioning 84 first sensor 42 within internal cavity 50 of housing 46 in line with aperture 48 and directing 86 energy 26 from the defined external source through aperture 48 so that energy 26 is applied to surface 41 of first sensor 42 causing first sensor 42 to produce first output signal 52.

Method 80 includes further positioning 88 second sensor 44 in internal cavity 50 of housing 48 so that only ambient energy from sources other than the defined external source is applied to surface 41 of second sensor 44. The ambient energy causes second sensor 44 to produce a second output signal 54.

Method 80 further includes subtracting 90 second output signal 54 from first output signal 52 to produce a corrected output signal 53 which more accurately defines the energy 26 from the defined external source than first output signal 52.

According to some preferred embodiments, method 80 further includes employing a data processing component 58 to calculate power 92 of the defined external source by integrating the corrected output signal produced over time.

Preferably method 80 further includes displaying 94 an indication of corrected output signal 53 on display device 61 as detailed hereinabove.

Preferably subtracting 90 of second output signal 54 from first output signal 52 is effected by means of electronic circuitry 96 as detailed hereinabove.

Preferably method 80 includes employing 98 a computerized central control unit to co-ordinate performance of method 80.

Performance of a device 40 with two sensors 42 and 44 under normal room conditions was assayed. A 10 mm×10 mm TEC element was employed as first sensor 42 and an identical TEC element was applied as second sensor 44.

In order to emphasize the superior performance of the improved two-sensor device 40, first output signal 52 is presented separately from corrected output signal 53 for comparison. Results are summarized in Table 1.

TABLE 1

Improvement in accuracy of measurement as a result of background subtraction.

| Assay conditions | Conventional measurement (first output signal 52) | Improved measurement (corrected output signal 53) |
| --- | --- | --- |
| Noise[a] level | 2 µW | 2 µW |
| Drift[b] of reading over approx. 1 hr. time period with room air conditioning switching on and off | 300 µW peak to peak | 30 µW peak to peak |
| Drift[b] of reading over approx. 1 hr. time period with room air conditioning on but not switching | 40 µW peak to peak | 4 µW peak to peak |

[a]Noise represents high frequency variations in reading where high frequency means over a period of 1–10 seconds.
[b]Drift represents low frequency variations in reading where low frequency means over a period of 10–30 minutes.

It is clear that provision of second sensor 44 and subtraction of the background of applied power resulting from environmental effects reduce the background effect dramatically, tenfold in this case. This means that the two-sensor configuration of device 40 enables the potential of the theoretically low noise level of the sensor employed in device 20 to be realized. While device 40 is described here as containing two TEC sensors, similar results would be anticipated using two sensors of any type.

According to a most preferred embodiment of the invention, use of a second sensor 44 as described hereinabove at least partially obviates the need for construction of housing 50 to shield and insulate the device.

It is expected that during the life of this patent many relevant sensor technologies will be developed and the scope of the term sensor is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed:

1. A device for measurement of at least one of power and energy from a defined external source, the device comprising:
   (a) a housing, said housing defining an internal cavity and having an aperture in fluid communication with an external environment;
   (b) a first temperature sensor, said first temperature sensor positioned in said internal cavity of said housing in line with said aperture so that the energy from the defined external source is applied to a surface of said first temperature sensor when the energy is directed through said aperture, said first temperature sensor producing a first output signal; and
   (c) a second temperature sensor, said second temperature sensor positioned in said internal cavity of said housing so that only ambient energy from sources other than the defined external source is applied to a surface of said second temperature sensor, said second temperature sensor producing a second output signal; wherein subtraction of said second output signal from said first output signal produces a corrected output signal, said corrected output signal more accurately defining the power or energy from the defined external source than said first output signal.

2. The device of claim 1, wherein said temperature sensors are thermoelectric coolers (TECs).

3. The device of claim 1, wherein said first and said second outputs are each a voltage.

4. The device of claim 1, wherein each of said first and second temperature sensors employ a thermopile to convert a temperature difference into a voltage proportional to a power.

5. The device of claim 1, further comprising a display capable of providing an indication of said corrected output signal.

6. The device of claim 5, wherein said electronic circuitry includes a connection between a negative terminal of said first temperature sensor and a negative terminal of said second temperature sensor.

7. The device of claim 1, wherein said defined external source is a laser beam.

8. The device of claim 1, wherein said subtraction of said second output signal from said first output signal is effected by means of electronic circuitry.

9. The device of claim 1, further comprising a computerized central control unit is employed to co-ordinate operation.

10. A method for measurement of at least one of power and energy from a defined external source, the method comprising:
    (a) providing a housing, said housing defining an internal cavity and having an aperture in fluid communication with an external environment;
    (b) positioning a first temperature sensor within said internal cavity of said housing in line with said aperture;
    (c) directing energy from the defined external source through said aperture so that the energy is applied to a surface of said first temperature sensor causing said first temperature sensor to produce a first output signal;
    (d) further positioning a second temperature sensor in said internal cavity of said housing so that only ambient energy from sources other than the defined external source is applied to a surface of said second temperature sensor, said ambient energy causing said second temperature sensor to produce a second output signal;
    (e) subtracting said second output signal from said first output signal to produce a corrected output signal, said corrected output signal more accurately defining the power or energy from the defined external source than said first output signal.

11. The method of claim 10, wherein said temperature sensors are thermoelectric coolers (TECs).

12. The method of claim 10, wherein said first and said second outputs are each a voltage.

13. The method of claim 10, wherein each of said first and second temperature sensors employ a thermopile to convert a temperature difference into a voltage proportional to a power.

14. The method of claim 10, further comprising a displaying an indication of said corrected output signal on a display device.

15. The method of claim 10, wherein said defined external source is a laser beam.

16. The method of claim 10, wherein said subtracting of said second output signal from said first output signal is effected by means of electronic circuitry.

17. The method of claim 16, wherein said electronic circuitry includes a connection between a negative terminal of said first temperature sensor and a negative terminal of said second temperature sensor.

18. The method of claim 10, further comprising employing a computerized central control unit to co-ordinate performance of the method.

* * * * *